Jan. 14, 1969 J. E. KESSEL 3,422,440
PLURAL RECORDER SYSTEM
Filed April 27, 1967 Sheet 1 of 2
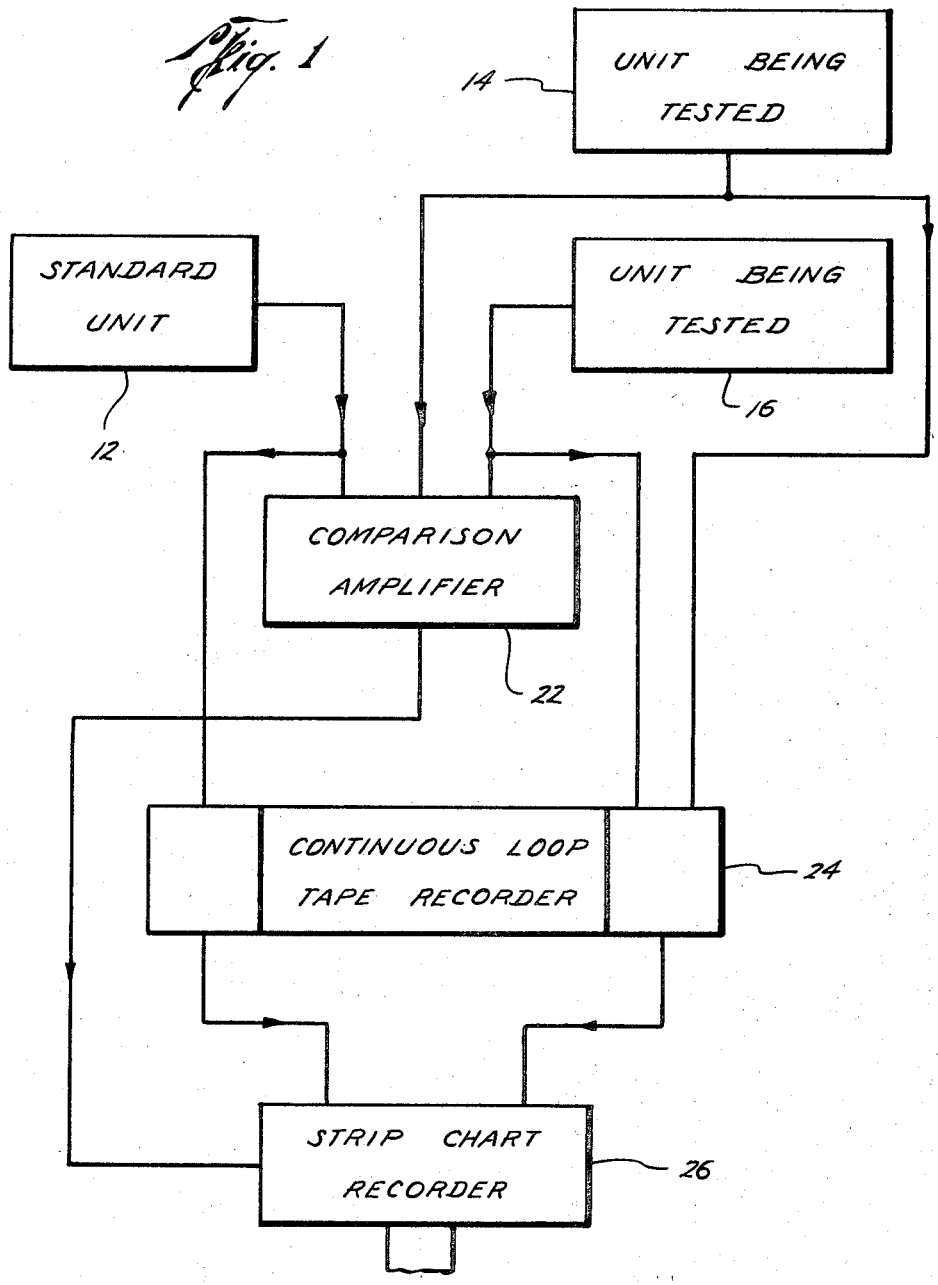

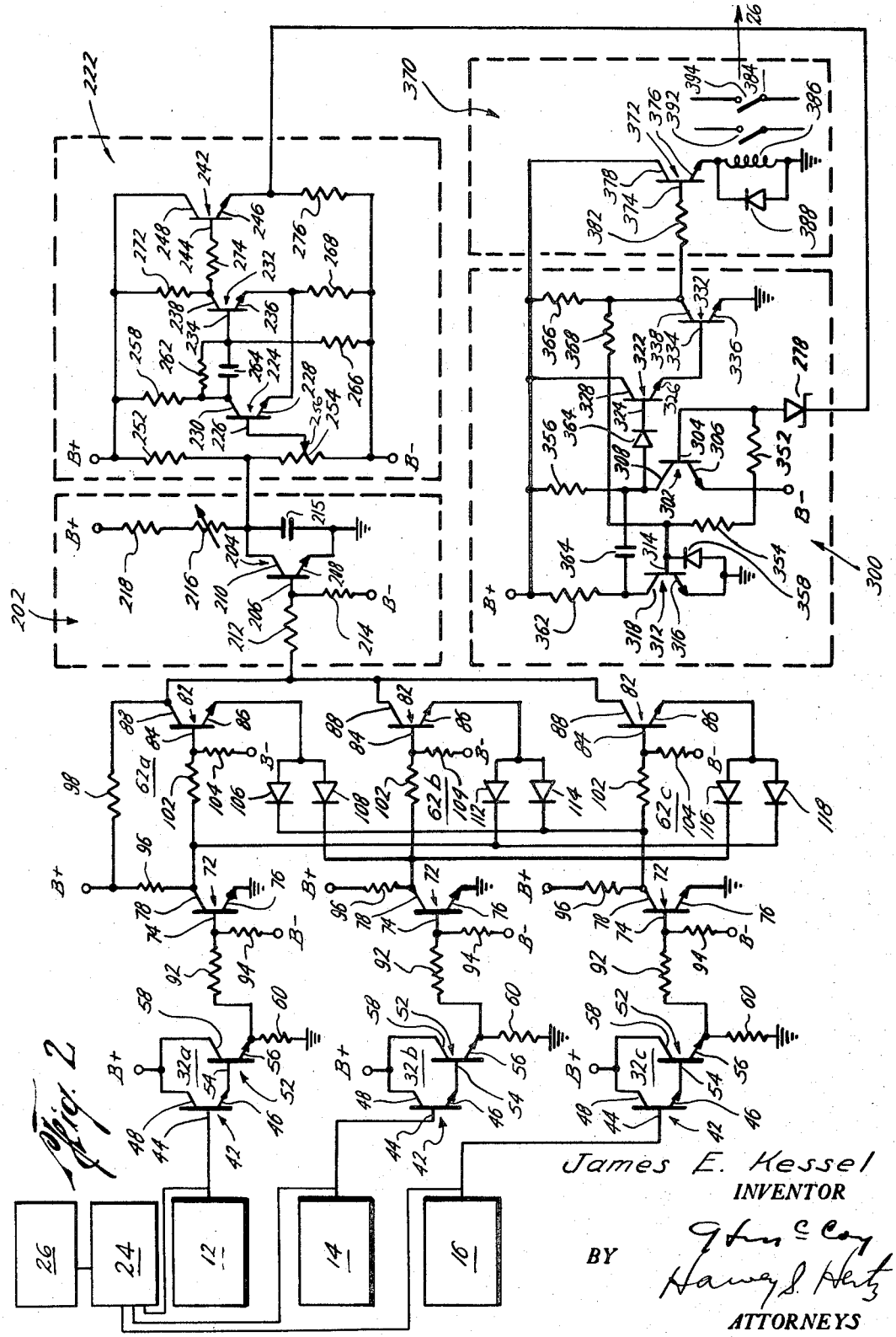

United States Patent Office 3,422,440
Patented Jan. 14, 1969

3,422,440
PLURAL RECORDER SYSTEM
James E. Kessel, Friendswood, Tex., assignor to the United States of America as represented by the Administrator of the National Aeronautics and Space Administration
Filed Apr. 27, 1967, Ser. No. 635,328
U.S. Cl. 346—44          2 Claims
Int. Cl. G01d 9/04; 9/08

ABSTRACT OF THE DISCLOSURE

A comparison amplifier is used to compare a reference generator with a plurality of test units whose outputs are monitored and compared with the reference generator signals. All the signals are fed to a comparison amplifier and when one of the signals is different, an output signal will be produced which is used to actuate a strip-chart recorder. The signals are also fed to a continuous loop tape recorder. From the continuous loop tape recorder the signals are reproduced on the strip-chart recorder when it is actuated. Thus, only when a variation between one of the input signals occurs does the strip-chart recorder record the signals. Provision is also made to record the signals prior to the time error occurs and after the error has been removed.

---

The invention described herein may be manufactured and used by or for the Government of the United States of America for governmental purposes without the payment of any royalties thereon or therefor.

This invention relates in general to recording systems, and, more particularly, to a system for comparing a plurality of input signals and recording them when all the input signals are not similar.

In long duration tests of systems which may be operating for hours, days, and even weeks such as during a manned or unmanned space flight, monitoring of equipment is necessary to determine whether the equipment is operationally satisfactory. Such operations must further be analyzed once the tests have been completed. Manually monitoring such equipment has the inherent disadvantage of requiring constant supervision during the test. Further, large amounts of data must be analyzed when the data is constantly permanently recorded.

In order to monitor data which is produced during long duration tests, the present invention provides a system for permanently recording the data only when unique and unusual data, not consistent with standard data, occurs. The invention continuously records data on a loop recording system and if the data is satisfactory, it is automatically erased. However, should errors occur which need analyzing, the data is automatically permanently reproduced.

More particularly, the invention comprises a reference generator which produces output signals considered normal and a plurality of units under test whose outputs are to be monitored and compared with the reference generator signals. The signals from the reference generator and the units under test are fed to both a comparison amplifier having a control unit and a continuous loop tape recorder. The output of the tape recorder is then fed to a normally inactive strip chart recorder. When the signals from the reference generator and units being tested are compared and found to be normal, no output is produced by the comparison amplifier. However, when a deviation does occur, the comparison amplifier control unit produces an output signal which causes the strip chart recorder to record signals present on the loop tape recorder, Thus, only signals which deviate from the reference generator output signal are recorded.

The advantage of this invention, both as to its construction and mode of operation, will be readily appreciated as the same become better understood by reference to the following detailed description when considered in connection with the accompanying drawings in which like reference numerals designate like parts throughout the figures, and wherein:

FIG. 1 is a block diagram of the system; and
FIG. 2 is a circuit diagram of a preferred embodiment of the comparison amplifier of FIG. 1.

Referring now to the drawings that are shown in FIG. 1, a reference generator 12 with a plurality of units 14, 16 which are to be tested. Signals from the standard time code generator 12, and units 14, 16 are fed to both a comparison amplifier 22, and a continuous loop tape recorder 24. The comparison amplifier contains a control unit so that when a deviation between the generator 12 and one of the units 14, 16 occurs, an output signal is produced and fed to a strip chart recorder 26, activating the strip chart recorder. The continuous loop tape recorder couples the recorded signals from the generator and units, and these are reproduced on the strip chart recorder when the strip chart recorder is activated.

Referring now to FIG. 2, there is shown a preferred embodiment circuit diagram of the comparison amplifier. Signals from the reference generator 12, and units 14, 16 are each coupled into emitter following circuits 32a, 32b, and 32c, respectively. Each of the emitter follower circuits comprise a first transistor 42 having a base 44, an emitter 46, and a collector 48; and, a second transistor 52 having a base 54, an emitter 56, and a collector 58. Output signals from the generator 12 and units 14 and 16 are fed to the base 44 of the respective emitter follower circuits. The collectors 48, 58 are connected together and joined to a source of positive voltage (B+). The emitter 46 is connected to the base 54, and the emitter 56 is connected through an output resistor 60 to ground.

Output signals from each of the emitter follower circuits 32a, 32b, and 32c are fed to a first, second, and third circuit 62a, 62b, and 62c, respectively. The circuits 62a, 62b, and 62c together form an exclusive OR network. Each of the circuits 62a, 62b, and 62c are formed of a first transistor 72 having a base 74, an emitter 76, and a collector 78; and a second transistor 82, formed of a base 84, an emitter 86, and a collector 88.

The emitter 56 of transistor 52 is connected to one side of an input resistor 92 the other side of which is connected to the base 74 of transistor 72 and to a source of negative potential (B−) through a resistor 94. The emitter 76 is connected to ground. The collector 78 and the collector 88 are connected through a resistor 96 and a resistor 98, respectively, to the source of positive potential. Further, the collector 78 is connected through a resistor 102 to the base 84. The base 84 is further connected through a biasing resistor 104 to the source of negative potential. The emitter 86 of circuit 62a is connected to the anode of a first diode 106 and the anode of a second diode 108. The emitter 86 of circuit 62b is connected to the anode of a third diode 112 and the anode of a fourth diode 114. The emitter 86 of circuit 62c is connected to the anode of a fifth diode 116 and the anode of a sixth diode 118. The cathode of diodes 106 and 114 are connected to the collector 78 of circuit 62c. The cathode of diode 108 and the cathode of diode 116 are connected to the collector 78 of circuit 62b. The cathode of diode 112 and the cathode of diode 118 are connected to the collector 78 of circuit 62a. The diodes 106, 108, 112, 114, 116, and 118 prevent and output signal from appearing at the output of the exclusive OR circuit when the inputs to each of the circuits 62a, 62b, and 62c are all a positive signal.

Each of the collectors 88 of the circuits 62a, 62b, and 62c are joined together and output signals derived from the exclusive OR network are coupled to a ramp generator 202. The ramp generator 202 comprises a transistor 204 having a base 206, an emitter 208, and a collector 210. The collectors 88 are coupled through an input resistor 212 to the base 206. The base 206 is also connected through a resistor 214 to the source of negative potential. The emitter 208 is connected to ground and a charging capacitor 215 is connected across the collector-emitter circuit of transistor 204. Further, the collector 210 is connected through a variable resistor 216 and a fixed resistor 218 to the source of positive potential.

Output signals from the ramp generator are coupled to the Schmitt trigger circuit 222. The Schmitt trigger circuit comprises a first transistor 224 having a base 226, an emitter 228, and a collector 230; a second transistor 232 having a base 234, an emitter 236, and a collector 238; and a third transistor 242 having a base 244, an emitter 246, and a collector 248.

Output signals from the ramp generator are coupled to one side of resistor 252, the other side of which is connected to the source of positive potential and to a resistor 254, the other side of which is connected to the source of negative potential. A variable tap 256 is connected to the resistor 254 and to the base 226 of transistor 224. The collector 230 is connected through a resistor 258 to the source of positive potential and through the parallel combination of a resistor 262 and a capacitor 264 to the base 234 of transistor 232. Further, the base 234 is connected through resistor 266 to the source of negative potential. The emitters 228 and 236 are tied together and connected through a resistor 268 to the source of negative potential. The collector 238 is connected through resistor 272 to the source of positive potential and through a resistor 274 to the base 244 of transistor 242. The emitter 246 is connected through a resistor 276 to the source of negative potential and the collector 248 is connected to the source of positive potential. Output signals from the Schmitt trigger circuit 222 are coupled from the emitter 246 to a Zener diode 278 at the cathode thereof. The anode of the Zener diode is coupled to a one-shot multivibrator 300.

The one-shot multivibrator 300 comprises a first transistor 302 having a base 304, an emitter 306, and a collector 308; a second transistor 312 having a base 314, an emitter 316, and a collector 318; a third transistor 322 having a base 324, an emitter 326, and collector 328; and a fourth transistor 332 having a base 334, an emitter 336, and a collector 338.

The anode of Zener diode 278 is connected to the base 304 and through a first pair of resistors 352, 354 to the base 314 of transistor 312. The emitter 306 of transistor 302 is connected to the source of negative potential and the collector 308 is connected through a resistor 356 to the source of positive potential. The base 314 of transistor 312 is connected to the cathode side of a diode 358, the anode of which is connected to ground. Further, the emitter 316 is connected to ground. The collector 318 is connected through a resistor 362 to the source of positive potential and through a capacitor 364 to the collector 308.

The collector 308 is connected to the anode of a diode 364, the cathode of which is connected to the base 324 of transistor 322. The collector 328 is connected to the source of positive potential, and the emitter 326 is connected to the base 334 of transistor 332. The emitter 336 is connected to ground and the collector 338 is connected through a resistor 366 to the source of positive potential and through a resistor 368 to the base 314 of transistor 312.

Output signals from the one-shot multivibrator 300 are coupled to a driver stage 370. The driver stage comprises a transistor 372 having a base 374, an emitter 376, and a collector 378. The collector 338 of transistor 334 is coupled through a resistor 382 to the base 374. The collector 378 is coupled to the source of positive potential. Output signals from the driver stage 370 are coupled from the emitter 376 to a relay 384. The relay comprises a coil 386 connected between the emitter 376 and ground, having a diode 388 connected thereacross whose anode is connected to ground and whose cathode is connected to emitter 376. Energization of the coil 386 causes armatures 392, 394 to close.

With the foregoing in mind, operation of the system depicted in block diagram form in FIG. 1 is as follows:

Output signals from the standard generator 12 of the units under test 14, 16 are fed into the comparsion amplifier 22. The comparison amplifier is in the form of an exclusive OR network so that when the signals from the generator 12 and units 14, 16 are similar, no output signal is produced from the amplifier 22. However, when differences occur between the standard generator 12 and either of the test units 14, 16, an output signal is produced by the comparison amplifier which activates the strip chart recorder 26.

Signals from the reference generator 12 and units 14, 16 are also fed to the continuous loop tape recorder 24 where the signals are recorded for an interval, such as 10-seconds, and then erased. When the strip chart recorder is activated by the signal from the amplifier 22, the recorded signals on the tape recorder 24 are reproduced at a time period commencing 10-seconds prior to the activation of the recorded 26. When the error is removed, the control unit commands the strip chart recorder off at a predetermined time interval, such as 20-seconds, after the error has been removed.

Referring now to FIG. 2, operation of the comparison amplifier 22 is as follows:

Output signals from the reference generator 12 and test units 14, 16 are coupled to emitter-follower circuits 32a, 32b, and 32c, respectively. The output signals from the emitter-follower circuits are then fed to the exclusive OR network which produces an "0" output if all signals are similar and a "1" if one of the input signals vary from the others.

With a "1" present at the output of the exclusive OR circuit, the capacitor 215 begins to charge and the Schmitt trigger circuit 222 produces an output pulse when the capacitor 215 reaches a predetermined voltage. The output of the Schmitt trigger circuit is coupled through the Zener diode 278 to the one-shot multivibrator 300. The output pulse from the Schmitt trigger circuit is applied to the base 304 of transistor 302 causing the transistor 302 to become conductive, which causes transistors 322 and 332 to become non-conductive. With transistor 332 off, transistor 372 of the driver stage becomes conductive, energizing relay 384 as current flows through the coil 386, closing armatures 392, 394, and thus turning on the strip-chart recorder 26.

Further, with transistor 332 non-conductive, transistor 312 becomes conductive, allowing capacitor 364 to charge. When the error signal has been removed, transistor 302 turns off, but transistors 322 and 332 remain non-conductive due to the charge across the capacitor 364. When the capacitor 364 has sufficiently discharged through resistor 356, transistors 322 and 332 once again become conductive causing transistor 372 to become non-conductive, thus de-energizing relay 384, thereby turning off recorded 26. Thus, when the error signal is removed, the recorder will record a portion of the correct signal for a time period consistent with the RC time constant of resistor 356 and capacitor 364.

Of course, an automatic shutdown may also be included should an error occur; that is a "1" output be produced by the exclusive OR circuit for a period greater than the specified amount of time. A 10-second pre-delay and a 20-second post-delay afford ample post-failure evaluation of the necessary point in time that the error occurred, as well as possible causes of the failure. However, other time delays are, of course, possible.

What is claimed and desired to be secured by Letters Patent is:

1. In a test system for comparing a plurality of input signals with a test signal and recording said signals in response to a predetermined condition comprising:

amplifier means for comparing said input signals with said test signal coupled to said input signals and said test signal, said amplifier means producing a first output signal when said predetermined condition exists, and a second output signal when said predetermined condition does not exist;

a continuous loop tape recorder means coupled to said plurality of input signals and test signal for recording said plurality of input signals and test signal for an interval of time and then erasing said signals;

rerecording means coupled to said continuous loop tape recorded and said amplifier, said signals from said amplifier controlling the operation of said rerecording means, the improvement which comprises the amplifier means including an exclusive OR circuit receiving said input signals and said test signals and producing said first output signal when said input signals are not similar to said test signal, thereby energizing the rerecording means to record the information from the continuous loop recorder during the predetermined condition.

2. A test system in accordance with claim 1 wherein said amplifier means includes a one-shot multivibrator, wherein said multivibrator changes stable states in response to said input signals, said stable states being delayed so as to reproduce on said rerecording means signals present on said tape loop recorder for a predetermined period when said predetermined condition no longer exists.

References Cited

UNITED STATES PATENTS

| 2,298,608 | 10/1942 | Bates | 346—44 |
| 3,181,171 | 4/1965 | Erickson | 346—33 X |
| 3,309,531 | 4/1967 | Hearn et al. | 307—88.5 |

RICHARD B. WILKINSON, *Primary Examiner.*

JOSEPH W. HARTARY, *Assistant Examiner.*

U.S. Cl. X.R.

307—216